US012233672B2

United States Patent
Schubert et al.

(10) Patent No.: US 12,233,672 B2
(45) Date of Patent: Feb. 25, 2025

(54) SYSTEMS AND METHODS TO SELECTIVELY ACTIVATE TPMS LEARNING MODE OPERATIONS IN A VEHICLE

(71) Applicant: Ford Global Technologies, LLC, Dearborn, MI (US)

(72) Inventors: Jochen Schubert, Farmington Hills, MI (US); Vishal Bhushan, Canton, MI (US); Dilip B. Patel, Novi, MI (US); Arick Evan Rushing, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 18/154,811

(22) Filed: Jan. 14, 2023

(65) Prior Publication Data
US 2024/0239143 A1    Jul. 18, 2024

(51) Int. Cl.
*B60C 23/04*    (2006.01)
(52) U.S. Cl.
CPC ...... *B60C 23/0415* (2013.01); *B60C 23/0471* (2013.01)
(58) Field of Classification Search
None
See application file for complete search history.

(56) References Cited

U.S. PATENT DOCUMENTS

| | | | |
|---|---|---|---|
| 9,340,075 B2 | 5/2016 | Guan et al. | |
| 2014/0180527 A1* | 6/2014 | Kosugi | B60C 23/0416 701/29.4 |
| 2020/0198416 A1* | 6/2020 | Lin | B60C 23/0459 |
| 2020/0391558 A1* | 12/2020 | Ghannam | B60C 23/0471 |
| 2022/0388353 A1* | 12/2022 | Lee | B60C 23/0416 |

FOREIGN PATENT DOCUMENTS

| | | |
|---|---|---|
| CN | 102555694 A | 7/2012 |
| CN | 106143005 A | 11/2016 |
| CN | 110406331 A | 11/2019 |

OTHER PUBLICATIONS

A. Kolodgie et al. "Enhanced TPMS Security Through Acceleration Timed Transmissions" (Dec. 2017).

* cited by examiner

*Primary Examiner* — Tamara L Weber
(74) *Attorney, Agent, or Firm* — Frank Lollo; Eversheds Sutherland (US) LLP

(57) ABSTRACT

This disclosure generally pertains to systems and methods that guard against information piracy by selective activation of tire pressure sensor learning operations in a vehicle. An example method can include receiving, by a processor in a vehicle, a sensor signal from a wheel movement sensor provided in a wheel of the vehicle. The processor may evaluate the sensor signal and detect a tire-changing operation. The tire-changing operation may be detected, for example, based on a major surface of the wheel coming in contact with ground or determining that an angular displacement of a major surface of the wheel exceeds a threshold angle. The processor may then enable a learning mode of operation that can include a wireless pairing of a tire pressure sensor in the wheel to a tire pressure monitoring system of the vehicle. The processor disables the learning mode of operation after a period of time.

19 Claims, 5 Drawing Sheets

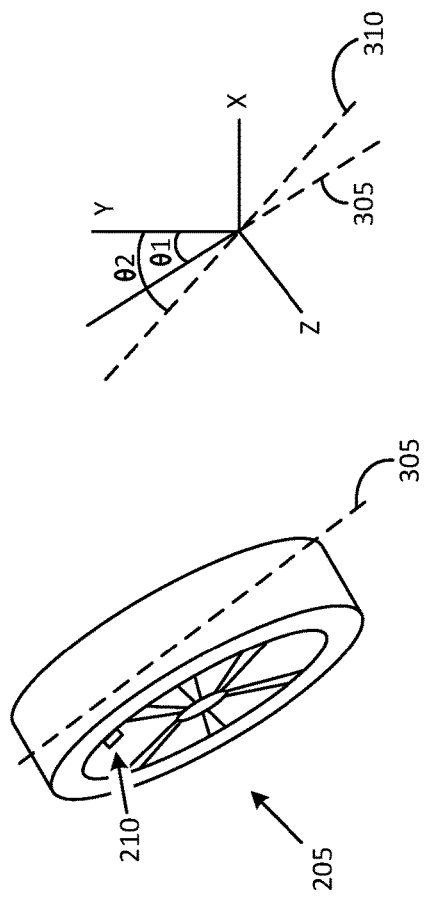
FIG. 3
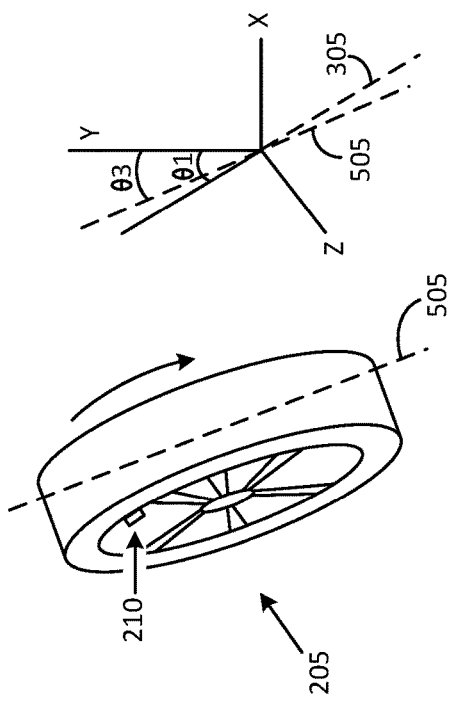
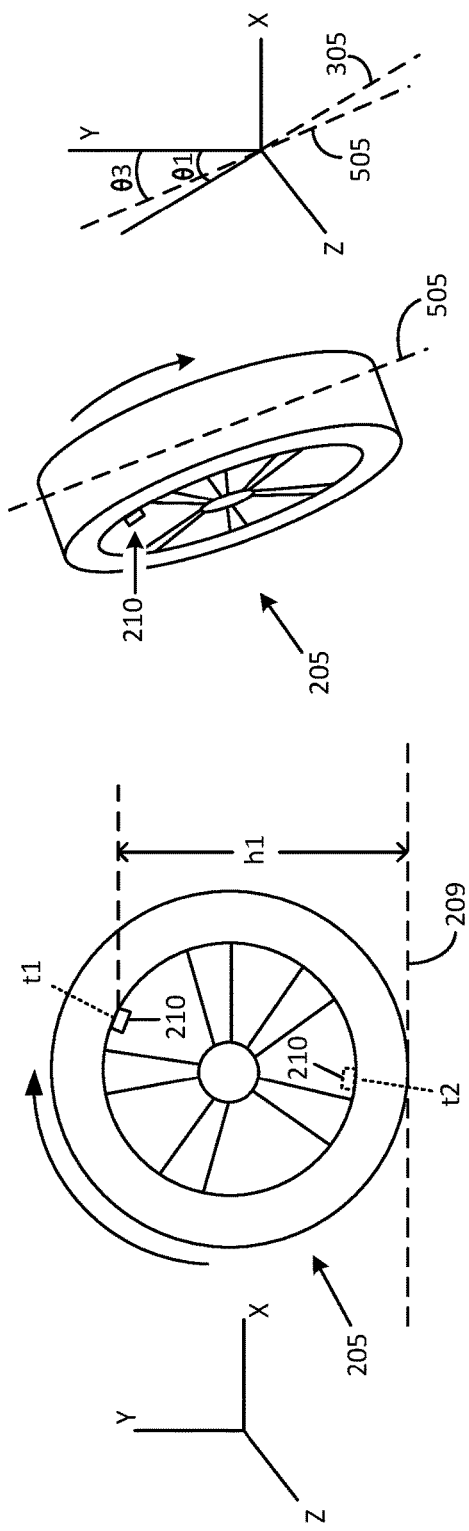
FIG. 5
FIG. 4

SYSTEMS AND METHODS TO SELECTIVELY ACTIVATE TPMS LEARNING MODE OPERATIONS IN A VEHICLE

BACKGROUND

Vehicles are often equipped with various devices that communicate with each other via wireless communications. Malicious actors can sometimes gain access to sensitive information by intercepting such wireless communications. One example of a device that employs wireless communications is a tire pressure sensor provided in each wheel of a vehicle for monitoring tire pressure. It is desirable to provide safeguards against malicious actors who may seek to gain access to information that may be contained in the wireless communications.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale.

Throughout this disclosure, depending on the context, singular and plural terminology may be used interchangeably.

FIG. 3 shows a wheel of a vehicle in a first example orientation that may be detected and used for performing various operations in accordance with the disclosure.

FIG. 4 shows a wheel of a vehicle in a second example orientation that may be detected and used for performing various operations in accordance with the disclosure.

FIG. 5 shows a wheel of a vehicle in a third example orientation that may be detected and used for performing various operations in accordance with the disclosure.

DETAILED DESCRIPTION

Overview

Figure 1:
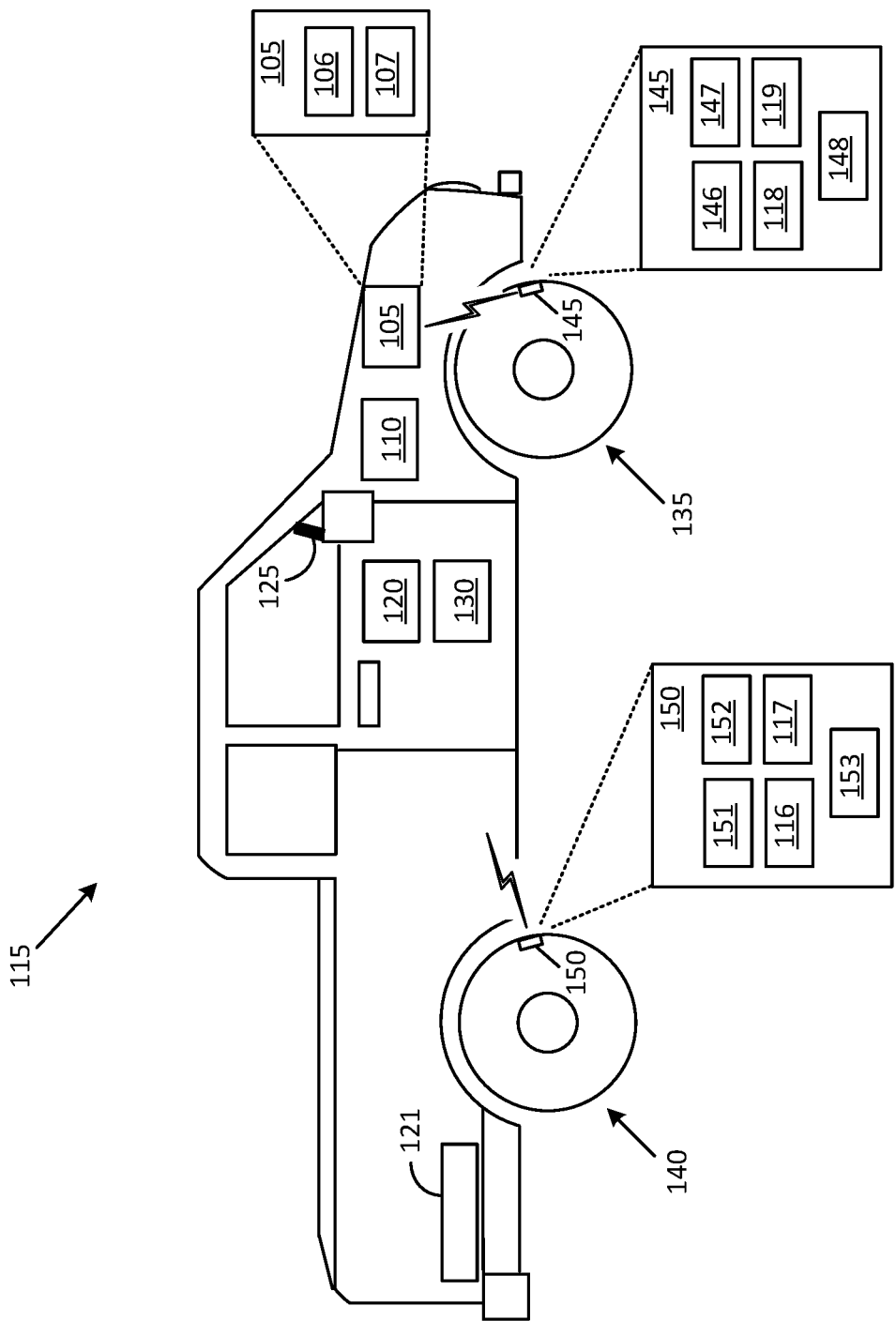
FIG. 1 shows an example vehicle that includes a tire pressure monitoring system in accordance with an embodiment of the disclosure.

In terms of a general overview, certain embodiments described in this disclosure generally pertain to selective activation of tire pressure sensor learning operations in a vehicle for guarding against information piracy. An example method to do so can include receiving, by a processor in a vehicle, a sensor signal from a wheel movement sensor provided in a wheel of the vehicle. The processor may detect a tire-changing operation being carried out upon the wheel based on evaluating the sensor signal. The tire-changing operation may be detected, for example, based on a major surface of the wheel coming in contact with ground or determining that an angular displacement of a major surface of the wheel exceeds a threshold angle. The processor may then enable a learning mode of operation that includes a wireless pairing of a tire pressure sensor in the wheel to a tire pressure monitoring system (TPMS) of the vehicle. The processor disables the learning mode of operation after a period of time in order to prevent information exposure.

Illustrative Embodiments

The disclosure will be described more fully hereinafter with reference to the accompanying drawings, in which example embodiments of the disclosure are shown. This disclosure may however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "wheel" as used in this disclosure refers to a wheel assembly that can include a tire and a support structure for the tire. The support structure can include, for example, a metal hub, a hub cap, and a rim upon which the tire is mounted. Words such as "movement," "motion," and "displacement" maybe used interchangeably in the disclosure and must be interpreted in the context in which used. Terms such as "learning mode," "learning procedure," and "learning mode of operation" maybe used interchangeably in the disclosure and must be interpreted in the context in which used. "Angle" and "angular displacement" maybe used interchangeably in the disclosure and must be interpreted in the context in which used. Words such as "enable" and "activate" maybe used interchangeably in the disclosure and must be interpreted in the context in which used.

The word "information," as used herein with reference to a device, refers to any of various forms of data produced by a device such as, for example, digital data, sensor signal data, and distance data. The word "sensor" maybe used interchangeably with the word "detector." Either word as used in this disclosure refers to various devices such as, for example, an accelerometer, a gyroscope, an inertial measurement unit (IMU), a pressure gauge, a transducer, and a motion detector.

The word "vehicle" as used herein can be any of various types of vehicles such as, for example, a gasoline powered vehicle, an electric vehicle, a hybrid electric vehicle, a car, a sports utility vehicle (SUV), a truck, a van, a semi-trailer truck, a bus, a driver-operated vehicle, or an autonomous vehicle. The phrase "autonomous vehicle" as used in this disclosure generally refers to a vehicle that can perform at least a few operations without human intervention. The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer.

The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control. The level of human intervention is very low. Level 5 (L5) vehicles are fully autonomous vehicles that do not involve human participation.

It must be understood that words such as "implementation," "configuration," "application," "scenario," "situation," "case," and "situation" as used herein represent abbreviated versions of the phrase "In an example ("implementation," "configuration," "application," "scenario," "situation," "case," "approach," and "situation") in accordance with the disclosure." The word "example" as used herein is intended to be non-exclusionary and non-limiting in nature.

FIG. 1 shows an example vehicle 115 that includes a tire pressure monitoring system 105 in accordance with an embodiment of the disclosure. The vehicle 115 may further include a vehicle computer 110, an infotainment system 125, a sensor system 130, a communications system 120, and a tire pressure monitoring sub-system in each of one or more wheels of the vehicle 115. The tire pressure monitoring system 105 can include a processor 106 and a memory 107 in which is stored computer-executable instructions that can be executed by the processor 106 to perform various operations in accordance with the disclosure. In another embodiment in accordance with the disclosure, each of one or more wheels of the vehicle 115 can include a tire pressure monitoring sub-system, which, in a first example implementation can operate independently for executing various operations in accordance with the disclosure and in a second example implementation can cooperate with the tire pressure monitoring system 105 for executing various operations in accordance with the disclosure. The illustrated example vehicle 115 includes a tire pressure monitoring sub-system 145 that may be provided in a passenger-side front wheel 135 and a tire pressure monitoring sub-system 150 that may be provided in a passenger-side rear wheel 140. It must be understood that the description provided herein with respect to various operations carried out by the tire pressure monitoring system 105 may be equally applicable to each of the tire pressure monitoring sub-systems provided in the wheels of the vehicle 115.

The vehicle computer 110 may perform various functions such as, for example, controlling engine operations (fuel injection, speed control, emissions control, braking, etc.), managing climate controls (air conditioning, heating etc.), detecting airbag activations, detecting engine malfunctions, and issuing alerts (check engine light, bulb failure, low tire pressure, vehicle in blind spot, etc.).

In an example implementation, the tire pressure monitoring system 105 can be integrated into the vehicle computer 110, and the processor 106 can be configured to execute various actions carried out typically by the vehicle computer 110 as well as additional actions that are carried out in accordance with the disclosure.

The infotainment system 125 can be an integrated unit that includes various components such as, for example, a radio, a CD player, a video player, and a navigation system. In an example implementation, the infotainment system 125 may include a display having a graphical user interface (GUI) for use by a driver of the vehicle 115. The display may be used by the tire pressure monitoring system 105 to display alerts related to tire pressure.

The sensor system 130 can include various types of sensing and/or detection devices. In an embodiment in accordance with the disclosure, the sensor system 130 can include one or more sensors in each of the wheels of the vehicle 115. More particularly, in the illustrated example, a passenger-side front wheel 135 includes a wheel movement sensor 118 and a tire pressure sensor 119 that may be included in the tire pressure monitoring sub-system 145. In an example implementation, the tire pressure monitoring sub-system 145 can further include a processor 146, a memory 147, and a wireless transceiver 148. The memory 147 can contain computer-executable instructions that can be executed by the processor 146 to perform various operations in accordance with the disclosure. In an example implementation, the processor 146 can operate independently for executing various operations in accordance with the disclosure and in a second example implementation can cooperate with the processor 106 in the tire pressure monitoring system 105 for executing various operations in accordance with the disclosure. It should be understood that the description herein with reference to components in the passenger-side front wheel 135 and operations performed by the components in the passenger-side front wheel 135 is equally applicable to all the other wheels of the vehicle 115 and components in these other wheels. The components can be substantially identical in some implementations and different in other implementations.

The tire pressure monitoring sub-system 150 provided in the passenger-side rear wheel 140 can include a wheel movement sensor 116 and a tire pressure sensor 117. In an example implementation, the tire pressure monitoring sub-system 150 can further include a processor 151, a memory 152, and a wireless transceiver 153. The memory 152 can contain computer-executable instructions that can be executed by the processor 151 to perform various operations in accordance with the disclosure. In an example implementation, the processor 151 can operate independently for executing various operations in accordance with the disclosure and in a second example implementation can cooperate with the processor 106 in the tire pressure monitoring system 105 for executing various operations in accordance with the disclosure. The wireless transceiver 153 is configured to support wireless communications between the tire pressure monitoring sub-system 150 and the tire pressure monitoring system 105.

In an example scenario, a spare wheel 121 may include similar components as described above with reference to the passenger-side front wheel 135 or the passenger-side rear wheel 140. However, in another example scenario, the spare wheel 121 may not include these components.

In an example embodiment, each individual wheel movement sensor of each wheel of the vehicle 115 may be assigned a unique identifier that allows the tire pressure monitoring system 105 to uniquely identify the wheel movement sensor and a wheel in which the wheel movement sensor is located. Each of the unique identifiers of the wheel movement sensors can be selected to be different than the identifiers associated with the various tire pressure sensors provided in the wheels of the vehicle.

In an example implementation, each wheel movement sensor is assigned a unique numeric identifier. Thus, for example, the wheel movement sensor 118 in the passenger-side front wheel 135 may have a first assigned numeric identifier (111, for example), the wheel movement sensor 116 in the passenger-side rear wheel 140 may have a second assigned numeric identifier (112, for example), a third wheel movement sensor in a driver-side front wheel of the vehicle may have a third assigned numeric identifier (113, for example), and a fourth wheel movement sensor in a driver-side rear wheel of the vehicle may have a fourth assigned numeric identifier (114, for example).

In another example implementation, each wheel movement sensor is assigned a unique alpha-numeric identifier. In yet another example implementation, each wheel movement sensor is assigned a unique Bluetooth identifier such as, for example, a Bluetooth® address.

The wheel movement sensor 118 in the tire pressure monitoring sub-system 145 can be configured to generate sensor signals in response to detecting various movements of the passenger-side front wheel 135 such as, for example, rotational movement, angular movement, and angular displacement. In an example implementation, the wheel movement sensor 118 is an accelerometer. The accelerometer may be mounted, for example, on a peripheral portion of a metal hub or on a rim portion of the passenger-side front wheel 135. In another example implementations, the wheel movement sensor 118 is an inertial measurement unit (IMU).

The wireless transceiver 148 that may be provided in the tire pressure monitoring sub-system 145 can be configured to communicate wirelessly with the tire pressure monitoring system 105 for transferring sensor signals generated by the wheel movement sensor 118 in response to various movements of the passenger-side front wheel 135. The wireless signals may have any of various frequencies and occupy any of various frequency bandwidths such as, for example, low-frequency (LF), very-high frequency (VHF), ultra-high frequency (UHF), and cellular frequencies.

In an example implementation, the sensor signals may be directly communicated to the tire pressure monitoring system 105 via wireless signals that may be formatted in any of various communication formats such as, for example, Bluetooth®, Bluetooth Low Energy (BLE®), and near field communications (NFC). In another example implementation, the sensor signals may be wirelessly communicated to the tire pressure monitoring system 105 via the communications system 120. The wireless signals may be formatted in any of various communication formats such as, for example, cellular, Wi-Fi, Wi-Fi direct, Ultra-Wideband (UWB), and Zigbee®. The communications system 120 may support such communications by use of a network (not shown). The network may include any one, or a combination of networks, such as a local area network (LAN), a wide area network (WAN), a telephone network, a cellular network, a cable network, a wireless network, and/or private/public networks such as the Internet.

The tire pressure sensor 119 is arranged to generate sensor signals in response to receiving a wireless activation signal transmitted by the tire pressure monitoring system 105. The wireless activation signal may be, for example, a 125 kHz low-frequency (LF) signal. The sensor signals generated by the tire pressure sensor 119 and wirelessly transmitted to the tire pressure monitoring system 105 in response to the activation signal, can include information such as, for example, tire air pressure, tire identification, location of tire on vehicle, and/or temperature of tire. In an example scenario, a sensor signal generated by the tire pressure sensor 119 and wirelessly transmitted to the tire pressure monitoring system 105 in response to the activation signal, is a UHF signal (314.9 MHz-433.92 MHz). In other example scenarios, the sensor signal can be wirelessly transmitted using other communication formats such as, for example, Bluetooth®. When using Bluetooth®, the wireless sensor signal can include information such as a Bluetooth® address (used for wirelessly pairing the sensor to the tire pressure monitoring system 105), authentication information, codes, and encryption information.

In another case, the tire pressure sensor 119 may automatically transmit a wireless signal to the vehicle computer 110 and/or to the tire pressure monitoring system 105, upon detecting a drop in air pressure inside a tire portion of the passenger-side front wheel 135. The drop in air pressure can be caused due to any of various contributing factors such as, for example, a puncture in the tire (nail, spike, etc.) or a drop in ambient temperature outside the tire. A low air pressure alert may be then displayed in the form of an alert light and/or as a visual alert upon a display screen of the infotainment system 125 (such as, for example, "Low air pressure in front passenger-side wheel").

Figure 2:
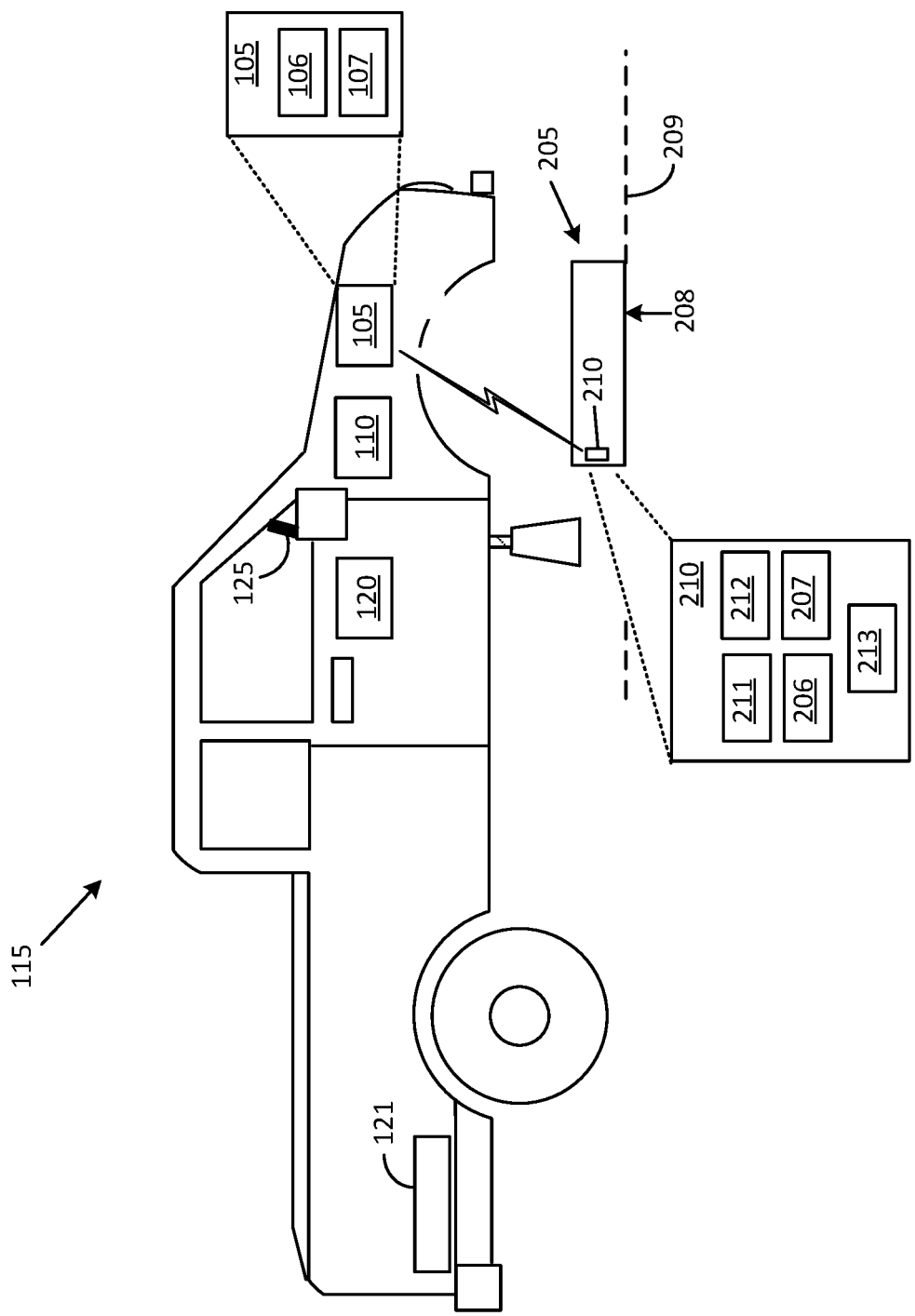
FIG. 2 shows an example scenario where a tire pressure monitoring system of a vehicle may be used in accordance with an embodiment of the disclosure.

FIG. 2 shows an example scenario where the tire pressure monitoring system 105 of the vehicle 115 may be used in accordance with an embodiment of the disclosure. In this example scenario, issues with a tire of the passenger-side front wheel 135 may be such that a tire-changing operation is to be performed for replacing the passenger-side front wheel 135 with a replacement wheel 205. The replacement wheel 205 may have a wheel movement sensor 206 and a tire pressure sensor 207 that can be included in a tire pressure monitoring sub-system 210. The tire pressure monitoring sub-system 210, which, in an example embodiment, can be substantially similar to the tire pressure monitoring sub-system 145 described above, can further include a processor 211, a memory 212, and a wireless transceiver 213. The wireless transceiver 213 can be configured to communicate wirelessly with the tire pressure monitoring system 105 for operations such as communicating requests, communicating information, and transferring sensor signals generated by the wheel movement sensor 206 in response to various movements of the replacement wheel 205.

In an example scenario, the tire pressure monitoring system 105 may have had no previous communications with the tire pressure sensor 207. In this example scenario, a learning procedure is executed, whereby the tire pressure sensor 207 transmits to the tire pressure monitoring system 105, information about the tire pressure sensor 207. More particularly, the information includes an identifier that is uniquely associated with the tire pressure sensor 207. The tire pressure monitoring system 105 may make note of the identifier and henceforth identify the tire pressure sensor 207 as well as the location of the replacement wheel 205 (front passenger side passenger of the vehicle 115). The learning procedure may also be executed by the processor 211 when a tire rotation operation is performed to enable the tire pressure monitoring sub-system 210 to recognize a position of the replacement wheel 205 and to communicate information associated with the replacement wheel 205 during, and/or after, secure communications have been established between the tire pressure monitoring sub-system 210 and the tire pressure monitoring system 105.

Execution of the learning procedure involves wireless communications between the tire pressure monitoring system 105 and the tire pressure sensor 207 in the replacement wheel 205. In an example scenario, the wireless communications (a Bluetooth® signal, for example) may be intercepted by a malicious entity (a hacker, for example) who may be present in the vicinity of the vehicle 115 (about 10 to 20 feet away from the vehicle 115, for example). The information obtained from the interception, particularly, the identifier information and/or encryption keys, can be misused by the malicious entity in various ways. For example, the identifier information may be used to broadcast for reception by the vehicle 115 a fraudulent message about the condition of a tire of the vehicle 115 or in some cases, to tamper with the vehicle computer 110 and/or the tire pressure monitoring system 105. It is therefore desirable to prevent, or at least mitigate, the opportunities provided to the malicious entity to intercept and misuse the wireless communications that occur during the learning procedure.

One way to do so in accordance with the disclosure, is to enable the learning procedure only when needed and to turn off the learning procedure at other times. In an example implementation, the learning procedure may be enabled when the tire pressure monitoring system 105 determines that a tire-changing operation is taking place and may be disabled subsequently after enough time is provided for the tire-changing operation to be carried out (an hour, for example).

In an example scenario, the tire-changing operation can involve the replacement wheel 205 being placed on a ground surface near the vehicle 115. At this time, the tire pressure monitoring system 105 may determine that the tire-changing operation is taking place based on one or more sensor signals received from the wheel movement sensor 206 provided in the replacement wheel 205. In one case, the wheel movement sensor 206 can be an accelerometer. A sensor signal from the accelerometer may indicate to the tire pressure monitoring system 105 that an orientation of the replacement wheel 205 is such that a major surface 208 of the replacement wheel 205 is making contact with a ground surface (indicated by a ground plane 209). In other scenarios, the tire pressure monitoring system 105 may determine that a tire-changing operation is taking place based on other conditions such as the example conditions described below.

FIG. 3 shows the replacement wheel 205 in a first example orientation that may be detected by the tire pressure monitoring sub-system 210 and/or the tire pressure monitoring system 105 for use in performing various operations in accordance with the disclosure. More particularly, the processor 211 of the tire pressure monitoring sub-system 210 may receive a sensor signal from the wheel movement sensor 206, which can be, for example, an accelerometer, and evaluate the sensor signal to determine the first orientation of the replacement wheel 205. In this case, the information contained in the sensor signal may provide an indication to the processor 211 that a major surface of the replacement wheel 205 has an angular displacement $\theta 2$ with respect to a vertical axis (y-axis). The angular displacement $\theta 2$ is indicated by a dashed line 310.

The angular displacement $\theta 2$ may occur at various times such as, for example, when the replacement wheel 205 is being handled during a tire-changing operation. In an example scenario, the replacement wheel 205 may be raised from a horizontal position (as illustrated in FIG. 2) and tilted while being lifted and moved towards an axle of the vehicle 115 prior to insertion into the axle. The angular displacement $\theta 2$ may occur when the replacement wheel 205 is tilted during this procedure.

In an example embodiment, the processor 211 of the tire pressure monitoring sub-system 210 may make a determination that the tire-changing operation is taking place based on comparing the angular displacement $\theta 2$ to a threshold angular displacement $\theta 1$. The threshold angular displacement $\theta 1$ may represent a maximum angular displacement that a wheel can undergo under normal circumstances when mounted upon an axle of the vehicle 115.

More particularly, the wheel can undergo various degrees of angular displacement with respect to various axes, either when the vehicle 115 is moving or when parked upon a sloped surface. For example, the wheel may tilt angularly when the vehicle 115 is traveling around a bend, making a turn, braking, or skidding.

In the illustrated example, the threshold angular displacement $\theta 1$, which is indicated by a dashed line 305, may range from about 30 degrees to about 45 degrees with respect to the vertical axis (y-axis). In other examples, the threshold angular displacement may have other various other ranges with respect to various other axes (x-axis and z-axis).

In the illustrated example scenario, the processor 211 of the tire pressure monitoring sub-system 210 may make a determination that the tire-changing operation is taking place based on detecting that the angular displacement $\theta 2$ is greater than the threshold angular displacement $\theta 1$. Upon making the determination, the processor 211 may communicate with the processor 106 of the tire pressure monitoring system 105. The processor 106 of the tire pressure monitoring system 105 may enable the learning procedure for a period of time that allows the tire-changing operation to be carried out (an hour, for example) followed by disabling of the learning procedure at the expiration of the period of time.

FIG. 4 shows the replacement wheel 205 in a second example orientation that may be detected by the tire pressure monitoring sub-system 210 and used for performing various operations in accordance with the disclosure. In this case, the information contained in a first sensor signal that is received by the processor 211 of the tire pressure monitoring sub-system 210 from the wheel movement sensor 206, at a first instant in time "t1," may provide an indication to the processor 211 that a major surface of the replacement wheel 205 is parallel to the y-axis (vertical with reference to the ground plane 209). The information contained in the first sensor signal may further indicate to the processor 211 that the wheel movement sensor 206 is located at a height "h1" above the ground plane 209 at the first instant in time "t1."

A second sensor signal that is received by the processor 211 from the wheel movement sensor 206, at a second instant in time "t2," may provide an indication to the processor 211 that a major surface of the replacement wheel 205 is still parallel to the y-axis and also that the wheel movement sensor 206 has moved and is now located close to the ground plane 209.

Based on evaluating the information obtained at the first instant in time "t1" and the second instant in time "t2," the processor 211 may communicate with the processor 106 of the tire pressure monitoring system 105. The processor 106 may determine that the replacement wheel 205 has been installed on the axle of the vehicle 115 and is undergoing a rotational motion as a result of a movement of the vehicle 115. Upon making this determination, the processor 106 of the tire pressure monitoring system 105 may ensure that the learning procedure is retained in a disabled state. Disabling the learning mode of operation at this time eliminates misuse of the information that may be carried in a sensor signal transmitted by any of the sensors in any of the tires of the vehicle 115.

In another example embodiment, the processor of tire pressure monitoring sub-system 210 may be configured to detect changes in force acting upon the replacement wheel 205 for determining that the replacement wheel 205 has been installed on the axle of the vehicle 115 and is undergoing a rotational motion as a result of a movement of the vehicle 115. In an example implementation, the changes in force can be related to forces of gravity acting upon the replacement wheel 205. In another example implementation, the changes in force can be related to centripetal forces acting upon the replacement wheel 205.

FIG. 5 shows the replacement wheel 205 in a third example orientation that may be detected by the tire pressure monitoring sub-system 210 and used for performing various operations in accordance with the disclosure. In this case, the information contained in a sensor signal from the wheel movement sensor 206 may provide an indication to the tire pressure monitoring sub-system 210 that a major surface of the replacement wheel 205 has an angular displacement θ3 with respect to a vertical axis. The angular displacement θ3, which is indicated by a dashed line 505 and is smaller than the threshold angular displacement θ1 (indicated by dashed line 305), may occur as a result of one of at least two example conditions. The first example condition may occur when the replacement wheel 205 is being moved towards the axle as a part of a tire-changing operation. The second example condition may occur when the replacement wheel 205 is already mounted upon the axle of the vehicle 115 and the vehicle 115 is moving.

In an example scenario, the processor 211 may distinguish between the two conditions by evaluating a first height of the wheel movement sensor 206 with respect to ground at a first instant in time and a second height of the wheel movement sensor 206 with respect to ground at a subsequent instant in time. The two heights can be substantially identical when the replacement wheel 205 is being moved towards the axle as a part of a tire-changing operation. Under this condition, the processor 211 may communicate with processor 106. The processor 106 may disable the learning mode procedure if the learning mode procedure has been previously enabled (for example, when the replacement wheel 205 was placed horizontally upon a ground surface during the tire-changing operation).

On the other hand, the two heights will be different when the replacement wheel 205 is rotating. The rotational movement combined with the angular displacement θ3 allows the processor 211 to conclude that the replacement wheel 205 is undergoing the angular displacement during a normal driving condition of the vehicle 115. Upon making this determination, the processor 211 may communicate with processor 106. The processor 106 may disable ensure that the learning procedure is retained in a disabled state. Disabling the learning mode of operation at this time eliminates misuse of the information that may be carried in a sensor signal transmitted by any of the sensors in any of the tires of the vehicle 115.

Figure 6:
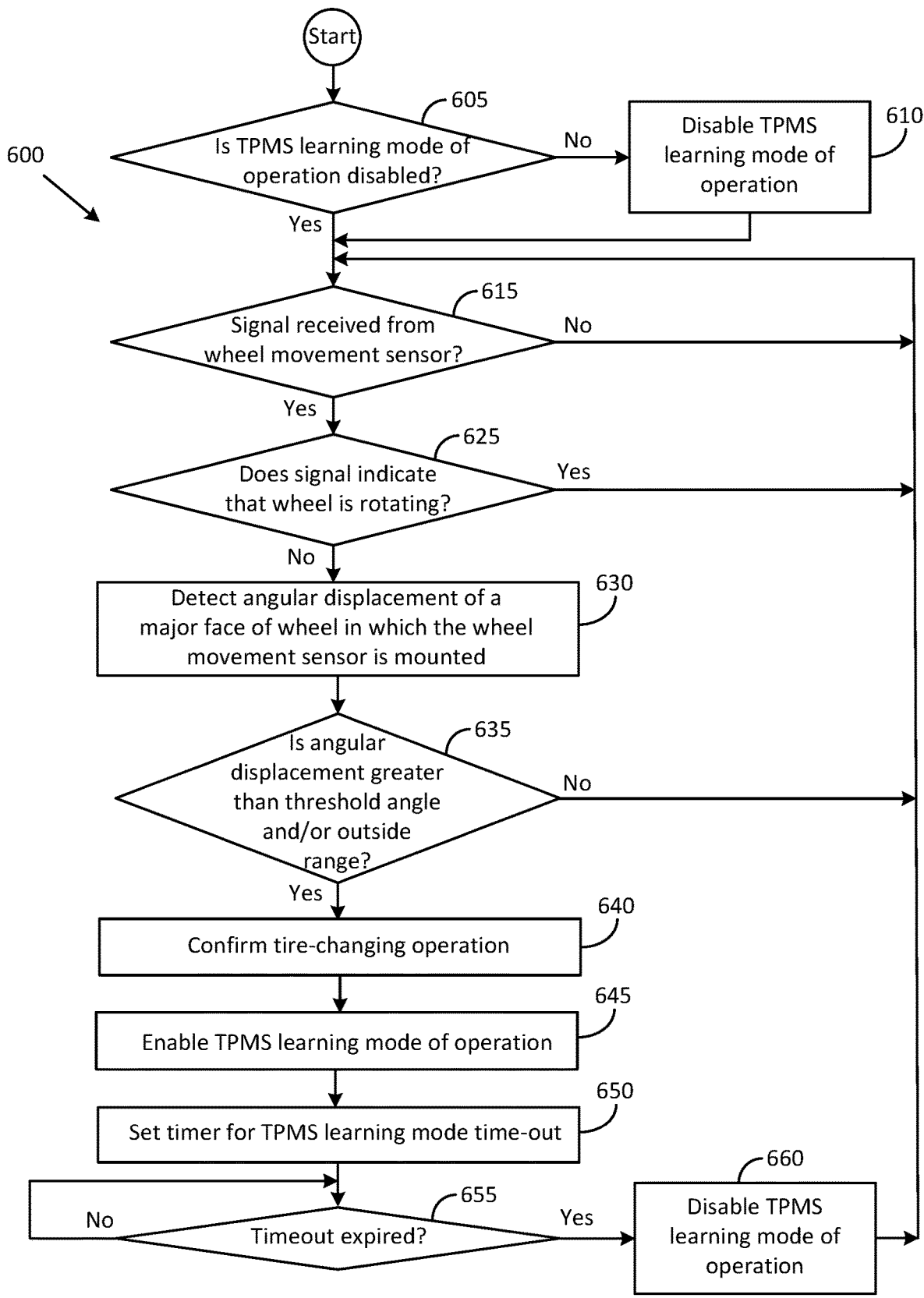
FIG. 6 shows a flowchart of an example method of operation of a tire pressure monitoring system in accordance with an embodiment of the disclosure.

FIG. 6 shows a flowchart 600 of an example method of operation of a tire pressure monitoring system in accordance with an embodiment of the disclosure. The flowchart 600 illustrates a sequence of operations that can be implemented in hardware, software, or a combination thereof. In the context of software, the operations represent computer-executable instructions stored on one or more non-transitory computer-readable media such as, for example, the memory 107 of the tire pressure monitoring system 105, the memory 147 of the tire pressure monitoring sub-system 145, the memory 152 of the tire pressure monitoring sub-system 150, and/or the memory 212 of tire pressure monitoring sub-system 210, that, when executed by one or more processors such as the processor 106 of the tire pressure monitoring system 105, the processor 146 of the tire pressure monitoring sub-system 145, the processor 151 of the tire pressure monitoring sub-system 150, and/or the processor 211 of the tire pressure monitoring sub-system 210 respectively, perform the recited operations. It must be understood that various operations described below as being carried out by a tire pressure monitoring system may be carried out by one or more tire pressure monitoring sub-systems either in an independent or in cooperation with each other.

Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 605, a determination may be made by a tire pressure monitoring system and/or a tire pressure monitoring sub-system of a vehicle whether a learning mode of operation of a tire pressure monitoring system (TPMS) is disabled. At block 610, the tire pressure monitoring system of the vehicle disables the learning mode of operation if at block 605, the determination indicates that the learning mode is in an enabled state. However, if at block 605, the determination indicates that the learning mode is disabled, at block 615, a determination is made whether a sensor signal has been received by a tire pressure monitoring sub-system from a wheel movement sensor provided in a wheel of the vehicle. The operation indicated at block 615 is also carried out after the action indicated at block 610.

If at block 615, the determination indicates that no sensor signal has been received from a wheel movement sensor, the tire pressure monitoring sub-system continues to wait to receive a sensor signal.

If at block 615, the determination indicates that a sensor signal has been received from a wheel movement sensor, at block 625, a determination is made whether a wheel that is associated with the sensor is rotating. In an example implementation, the tire pressure monitoring sub-system may make the determination based on evaluating a first height of the wheel movement sensor with respect to ground at a first instant in time and a second height of the wheel movement sensor with respect to ground at a subsequent instant in time. The tire pressure monitoring sub-system determines that the wheel is rotating if a difference exists between the two heights. In this case, the action indicated at block 615 and subsequent blocks are re-executed.

Conversely, in this example implementation, the tire pressure monitoring sub-system determines that the wheel is not rotating if the second height is substantially identical to the first height. In this case, at block 630, an angular displacement of a major face of the wheel is detected. In an example implementation, the wheel movement sensor is an accelerometer and the angular displacement is detected based on evaluating a sensor signal received from the accelerometer.

At block 635, a determination is made whether the angular displacement is greater than a threshold angular displacement and/or is outside a range of angles. In one example scenario that is described above and illustrated in FIG. 3, the tire pressure monitoring sub-system determines that the wheel is mounted upon an axle of the vehicle, based on detecting that an angular displacement $\theta 2$ of the wheel is less than a threshold angular displacement $\theta 1$. In this case, the action indicated at block 615 and subsequent blocks are re-executed.

In another example scenario that is described above, the tire pressure monitoring sub-system determines that a tire-changing operation may be taking place, based on detecting that an angular displacement $\theta 3$ of the wheel is greater than a threshold angular displacement $\theta 1$. In this case, at block 640, which can be an optional operation, the tire pressure monitoring sub-system may perform some additional operations to confirm that a tire-changing operation is taking place. The additional operations can include, for example, evaluating sensor signals provided by the accelerometer (or an IMU) to identify actions such as movements of the wheel along various axes, jostling movements, and/or erratic movements. The actions indicated in block 640 may also be carried out based on detecting that the angular displacement $\theta 3$ of the wheel exceeds a range of angular displacements such as, for example, when the threshold angular displacement $\theta 1$ (which is indicated by a dashed line 305 in FIG. 3) has an example range from about 30 degrees to about 45 degrees with respect to the vertical axis (y-axis).

In another example scenario, the sensor signal may be received by the tire pressure monitoring system from a wheel movement sensor provided in a wheel that has been stored for a period of time (in a wheel well of the vehicle or in a garage, for example) and is being moved for mounting upon an axle of the vehicle as a replacement wheel. In this scenario, the angular displacement $\theta 3$ may occur when the wheel is being moved from a horizontal position when stored towards a vertical position as a part of a tire-changing operation. The tire pressure monitoring sub- system may confirm that the wheel is being moved as a part of the tire-changing operation by identifying and evaluating a time lapse between a first angular displacement of the major surface of the wheel with respect to a horizontal axis and a previous angular displacement of the major surface of the wheel with respect to a vertical axis. The previous angular displacement can occur, for example, when the wheel is being stored in the wheel well or garage, for example.

Having determined that a tire-changing operation is taking place, at block 645, the tire pressure monitoring sub-system communicates with the tire pressure monitoring system, which then enables a tire pressure monitoring system (TPMS) learning mode of operation. As described above, the learning procedure allows the tire pressure monitoring system to obtain information about the replacement wheel and other aspects associated with the tire-changing operation (air pressure in tire, temperature, etc.). In an example implementation, the learning procedure includes a wireless pairing of a tire pressure sensor with the tire pressure monitoring system (a Bluetooth® pairing, for example). Thus, the sharing of encryption key or other private information used to ensure secure communications between the tire pressure sensors and tire pressure monitoring system may be limited to only during the learning procedure so other third parties are not able to track or spoof the sensors.

At block 650, a timer is set for a TPMS learning mode time-out. In an example implementation, the time-out is set in accordance with an estimated amount of time that may be taken to complete the wheel changing operation (1 hour, 2 hours, etc.).

At block 655, a determination is made whether the time-out has expired. If not expired, the tire pressure monitoring system awaits a time-out. If the time-out has expired, at block 660, the TPMS learning mode of operation is disabled. Disabling the learning mode of operation at this time eliminates misuse of the information that may be carried in a sensor signal transmitted by any of the sensors in tires of the vehicle 115.

Figure 7:
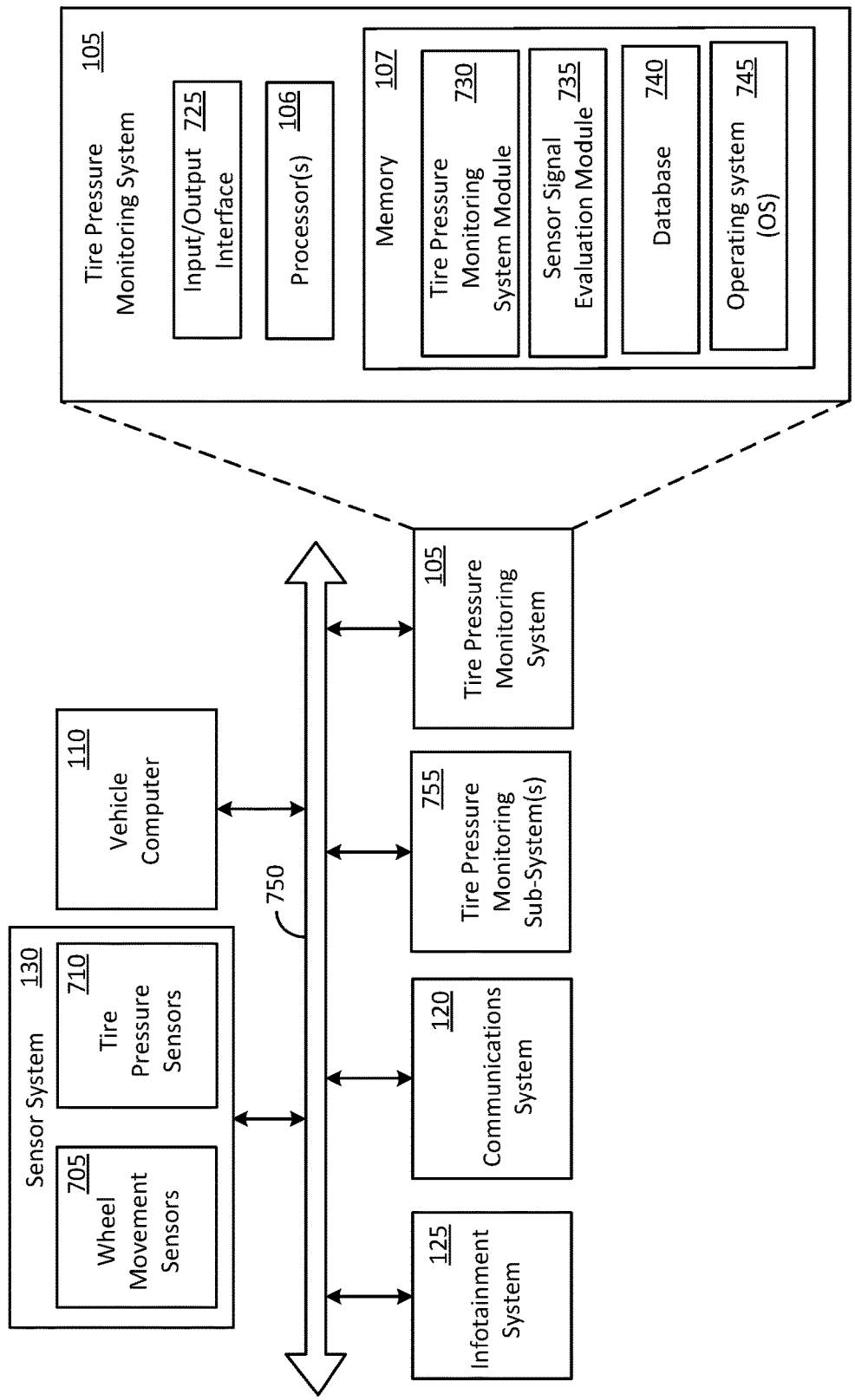
FIG. 7 shows some example components that can be included in a vehicle that is equipped with a tire pressure monitoring system in accordance with an embodiment of the disclosure.

FIG. 7 shows some example components that may be included in the vehicle 115 in accordance with an example embodiment of the disclosure. The example components may include the tire pressure monitoring system 105, the vehicle computer 110, the infotainment system 125, the communications system 120, the sensor system 130 that includes wheel movement sensors 705 and tire pressure sensors 710, and one or more tire pressure monitoring sub-systems 755 (such as, for example, the tire pressure monitoring sub-system 145, the tire pressure monitoring sub-system 150 the tire pressure monitoring sub-system 210). Some aspects of these components have been described above.

The various components are communicatively coupled to each other via one or more buses such as an example bus 750. The bus 750 may be implemented using various wired and/or wireless technologies. For example, the bus 750 can be a vehicle bus that uses a controller area network (CAN) bus protocol, a Media Oriented Systems Transport (MOST) bus protocol, and/or a CAN flexible data (CAN-FD) bus protocol. Some or all portions of the bus 750 may also be implemented using wireless technologies such as Bluetooth®, Zigbee®, or near-field-communications (NFC).

The wheel movement sensors 705 may be provided in each wheel of the vehicle 115 and in at least some cases, may be provided in a replacement wheel as well. Some example wheel movement sensors have been described above (wheel movement sensor 118, wheel movement sensor 116, etc.).

The tire pressure sensors 710 may be provided in each wheel of the vehicle 115 and in at least some cases, may be provided in a replacement wheel as well. Some example tire pressure sensors have been described above (tire pressure sensor 119, tire pressure sensor 117, etc.).

The tire pressure monitoring system 105 can include an input/output interface 725 that is configured to allow the tire pressure monitoring system 105 to receive sensor signals from the various wheel movement sensors and the various tire pressure sensors. In an example implementation, the sensor signals are wirelessly conveyed to the tire pressure monitoring system 105. The wireless signals may have any of various frequencies and occupy any of various frequency bandwidths such as, for example, low-frequency (LF), very-high frequency (VHF), ultra-high frequency (UHF), and cellular frequencies. In an example implementation, the sensor signals may be formatted in any of various communication formats such as, for example, Bluetooth®, cellular, NFC, Wi-Fi, Wi-Fi direct, Ultra-Wideband (UWB), and Zigbee®.

The tire pressure monitoring system 105 can further include the processor 106 and the memory 107. The memory 107, which is one example of a non-transitory computer-readable medium, may be used to store an operating system (OS) 745, a database 740, and code modules such as a tire pressure monitoring system module 730 and a sensor signal evaluation module 735.

The code modules are provided in the form of computer-executable instructions that can be executed by the processor 106 for performing various operations in accordance with the disclosure. In one example implementation, the tire pressure monitoring system module 730 may be executed by the processor 106 for executing various operations such as the actions described above with reference to the flowchart 600. The sensor signal evaluation module 735 may be executed by the processor 106 to evaluate sensor signals provided by the various wheel movement sensors and the tire pressure sensors.

The database 740 may contain information such as, for example, specifications pertaining to typical tire pressure ranges, trigger values for issuing a low air-pressure alert, threshold angle values, TPMS identifiers, and wheel movement sensor identifiers.

It must be understood that the description provided above with respect to components of the tire pressure monitoring system 105 is equally applicable to the tire pressure monitoring systems that may be provided in the wheels of the vehicle 115, such as, for example, the tire pressure monitoring sub-system 145 provided in the passenger-side front wheel 135 and the tire pressure monitoring sub-system 150 provided in the passenger-side rear wheel 140.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 107, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may" unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by a processor in a vehicle, a first sensor signal from a wheel movement sensor provided in a wheel of the vehicle;
   detecting, by the processor, based on evaluating the first sensor signal, a tire-changing operation being carried out upon the wheel;
   enabling, by the processor, based on detecting the tire-changing operation, a learning mode of operation that comprises a wireless pairing of a tire pressure sensor in the wheel to a tire pressure sensor system of the vehicle; and
   disabling, by the processor, the learning mode of operation upon expiry of a first period of time after enabling of the learning mode of operation.

2. The method of claim 1, wherein detecting the tire-changing operation comprises determining, based on evaluating the first sensor signal, that at least a portion of a major surface of the wheel is in contact with a ground surface.

3. The method of claim 2, wherein the learning mode of operation is enabled based on determining that the at least the portion of the major surface of the wheel is in contact with the ground surface.

4. The method of claim 1, wherein detecting the tire-changing operation comprises:
   detecting, by the processor, based on evaluating the first sensor signal, an angular displacement of a major surface of the wheel with respect to a vertical axis;
   determining, by the processor, that the angular displacement exceeds a threshold angle; and
   detecting, by the processor, the tire-changing operation, based on determining that the angular displacement exceeds the threshold angle.

5. The method of claim 4, wherein the threshold angle is selected with respect to the vertical axis.

6. The method of claim 1, wherein detecting the tire-changing operation comprises:
   detecting, by the processor, based on evaluating the first sensor signal, a first angular displacement of a major surface of the wheel with respect to a horizontal axis;
   receiving, by the processor, a second sensor signal from the wheel movement sensor provided in the wheel of the vehicle;
   detecting, by the processor, based on evaluating the second sensor signal, that the wheel has been mounted upon an axle of the vehicle;
   enabling, by the processor, based on detecting that the wheel has been mounted upon the axle of the vehicle, the learning mode of operation; and
   disabling, by the processor, the learning mode of operation upon expiry of a second period of time after enabling of the learning mode of operation.

7. The method of claim 6, wherein detecting the tire-changing operation further comprises:
   determining, by the processor, a time lapse between the first angular displacement of the major surface of the wheel with respect to the horizontal axis and a previous angular displacement of the major surface of the wheel with respect to a vertical axis; and
   determining, by the processor, based on evaluating the time lapse, that the wheel is being moved from a horizontal storage position as a part of the tire-changing operation.

8. A method comprising:
   receiving, by a processor in a vehicle, a sensor signal from a wheel movement sensor provided in a wheel of the vehicle;
   detecting, by the processor, based on evaluating the sensor signal, one of a first state or a second state, the first state associated with a first movement of the wheel due to a motion of the vehicle, the second state associated with a second movement of the wheel due to a tire-changing operation;
   enabling, by the processor, based on detecting the second state, a learning mode of operation that comprises a wireless pairing of a tire pressure sensor in the wheel to a tire pressure sensor system of the vehicle; and disabling, by the processor, the learning mode of operation upon expiry of a first period of time after enabling of the learning mode of operation.

9. The method of claim 8, wherein the wheel movement sensor is an accelerometer, wherein detecting the first state comprises detecting a rotation of the wheel, and wherein detecting the second state comprises determining that a first angular displacement of a major surface of the wheel exceeds a threshold angular displacement.

10. The method of claim 9, further comprising:
detecting, by the processor, a second angular displacement of the major surface of the wheel during the rotation of the wheel; and
selecting the threshold angular displacement to one of equal or exceed the second angular displacement.

11. The method of claim 8, wherein the wheel movement sensor is an accelerometer, wherein detecting the first state comprises detecting a rotation of the wheel, and wherein detecting the second state comprises detecting a transitioning of the wheel from one of a vertical position to a horizontal position with respect to a ground plane or vice-versa.

12. The method of claim 8, wherein the wheel movement sensor is an accelerometer, wherein detecting the first state comprises detecting a rotation of the wheel, and wherein detecting the second state comprises determining that a major surface of the wheel is in contact with a ground surface.

13. A vehicle comprising:
a tire pressure monitoring system comprising:
a sensor system;
a memory that stores computer-executable instructions; and
a processor configured to access the memory and execute the computer-executable instructions to perform operations comprising:
receiving a first sensor signal from the sensor system;
detecting, based on evaluating the first sensor signal, a tire-changing operation being carried out upon a wheel of the vehicle;
determining that a learning mode of operation that is supported by the tire pressure monitoring system is disabled;
enabling, based on detecting the tire-changing operation, the learning mode of operation, the learning mode of operation comprising a wireless pairing of the tire pressure monitoring system to a tire pressure sensor in the wheel of the vehicle; and
disabling the learning mode of operation upon expiry of a first period of time after enabling of the learning mode of operation.

14. The vehicle of claim 13, wherein the sensor system includes the tire pressure sensor and a wheel movement sensor mounted in the wheel of the vehicle, and wherein detecting the tire-changing operation being carried out upon the wheel comprises:

detecting, based on evaluating the first sensor signal, one of a first state or a second state, the first state associated with a first movement of the wheel due to a motion of the vehicle, the second state associated with a second movement of the wheel due to the tire-changing operation.

15. The vehicle of claim 14, wherein the wheel movement sensor is one of an accelerometer or an inertial measurement unit, wherein detecting the first state comprises detecting a rotation of the wheel, and wherein detecting the second state comprises determining that a major surface of the wheel is in contact with a ground surface.

16. The vehicle of claim 14, wherein detecting the first state comprises detecting a rotation of the wheel, and wherein detecting the second state comprises determining that a first angular displacement of a major surface of the wheel exceeds a threshold angular displacement.

17. The vehicle of claim 16, wherein the processor is further configured to access the memory and execute the computer-executable instructions to perform operations comprising:
detecting a second angular displacement of the major surface of the wheel during the rotation of the wheel; and
selecting the threshold angular displacement to one of equal or exceed the second angular displacement.

18. The vehicle of claim 13, wherein the sensor system includes the tire pressure sensor and a wheel movement sensor mounted in the wheel of the vehicle, and wherein the processor is further configured to access the memory and execute the computer-executable instructions to perform operations comprising:
detecting, based on evaluating the first sensor signal, a first angular displacement of a major surface of the wheel with respect to a horizontal axis;
receiving a second sensor signal from the wheel movement sensor;
detecting, based on evaluating the second sensor signal, that the wheel has been mounted upon an axle of the vehicle;
enabling, based on detecting that the wheel has been mounted upon the axle of the vehicle, the learning mode of operation; and
disabling the learning mode of operation upon the expiry of the first period of time after enabling of the learning mode of operation.

19. The vehicle of claim 18, wherein the processor is further configured to access the memory and execute the computer-executable instructions to perform operations comprising:
determining a time lapse between the first angular displacement of the major surface of the wheel with respect to the horizontal axis and a previous angular displacement of the major surface of the wheel with respect to a vertical axis; and
determining, based on evaluating the time lapse, that the wheel is being moved from a horizontal storage position as a part of the tire-changing operation.

* * * * *